Oct. 5, 1948.  F. B. DOYLE  2,450,645

METHOD OF FREEZING FOOD

Original Filed Oct. 28, 1943  2 Sheets-Sheet 1

INVENTOR
Frank B. Doyle.
BY
HIS ATTORNEY.

Oct. 5, 1948.       F. B. DOYLE        2,450,645
METHOD OF FREEZING FOOD
Original Filed Oct. 28, 1943        2 Sheets-Sheet 2
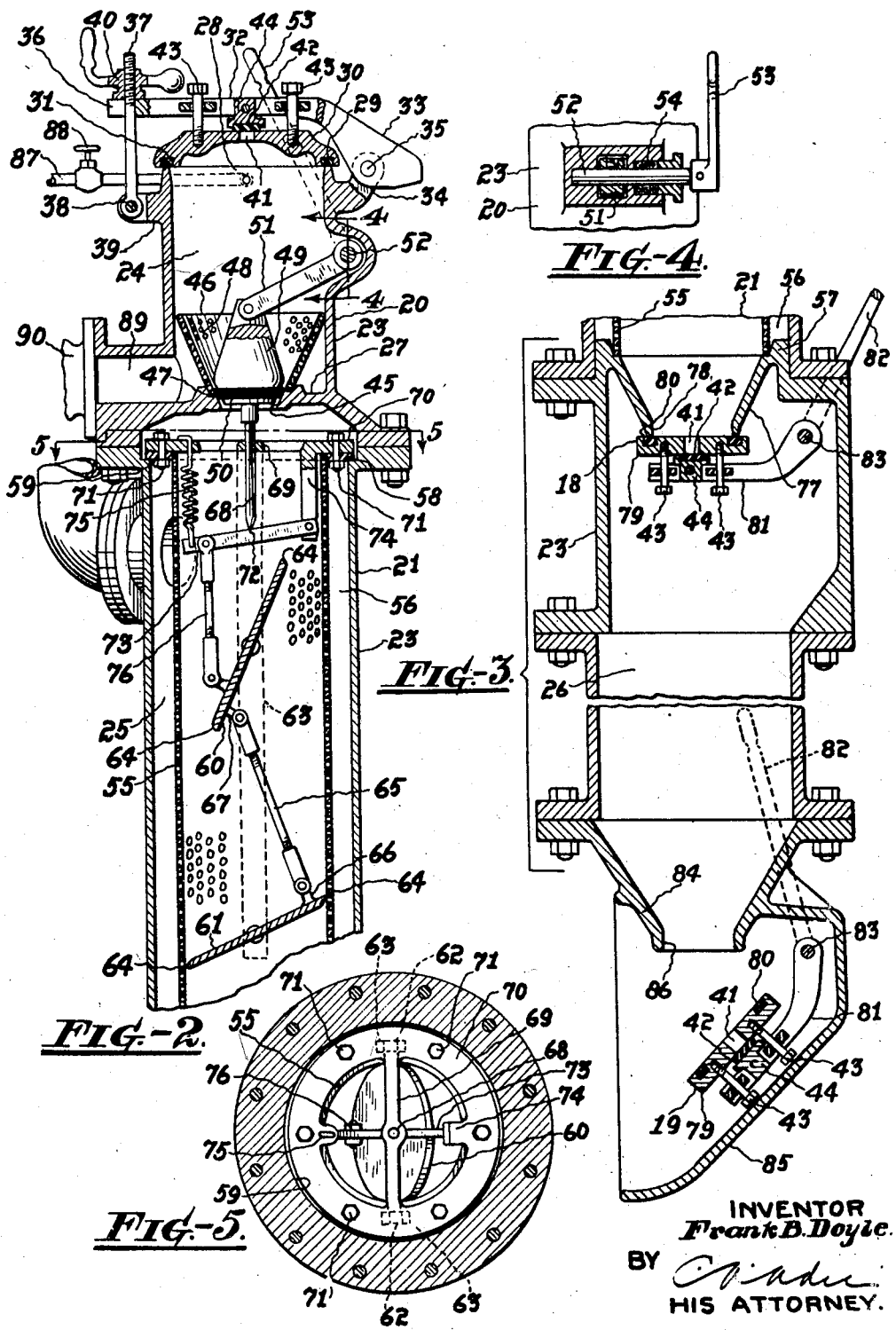
INVENTOR
*Frank B. Doyle*
BY
HIS ATTORNEY.

Patented Oct. 5, 1948

2,450,645

UNITED STATES PATENT OFFICE 2,450,645

METHOD OF FREEZING FOOD

Frank B. Doyle, Phillipsburg, N. J., assignor to Ingersoll-Rand Company, New York, N. Y., a corporation of New Jersey Original application October 28, 1943, Serial No. 507,993. Divided and this application November 15, 1944, Serial No. 563,595

3 Claims. (Cl. 99—192)

This invention relates to the processing of food products, and more particularly to apparatus for and method of freezing vegetable material and the like.

This is a division of my co-pending application Serial No. 507,993, filed October 28, 1943, now Patent No. 2,407,482.

It is an object of the invention to avoid the exposure of the material to air throughout all the steps of processing and during the transference of the material from one processing zone to another.

A further object is to preserve the original vitamin content of the food product.

Another object is to facilitate the transfer of the food product from one processing zone to another.

Still another object is to avoid the unnecessary expenditure of power for processing the material.

Other objects will be in part obvious and in part pointed out hereinafter.

Figure 1:
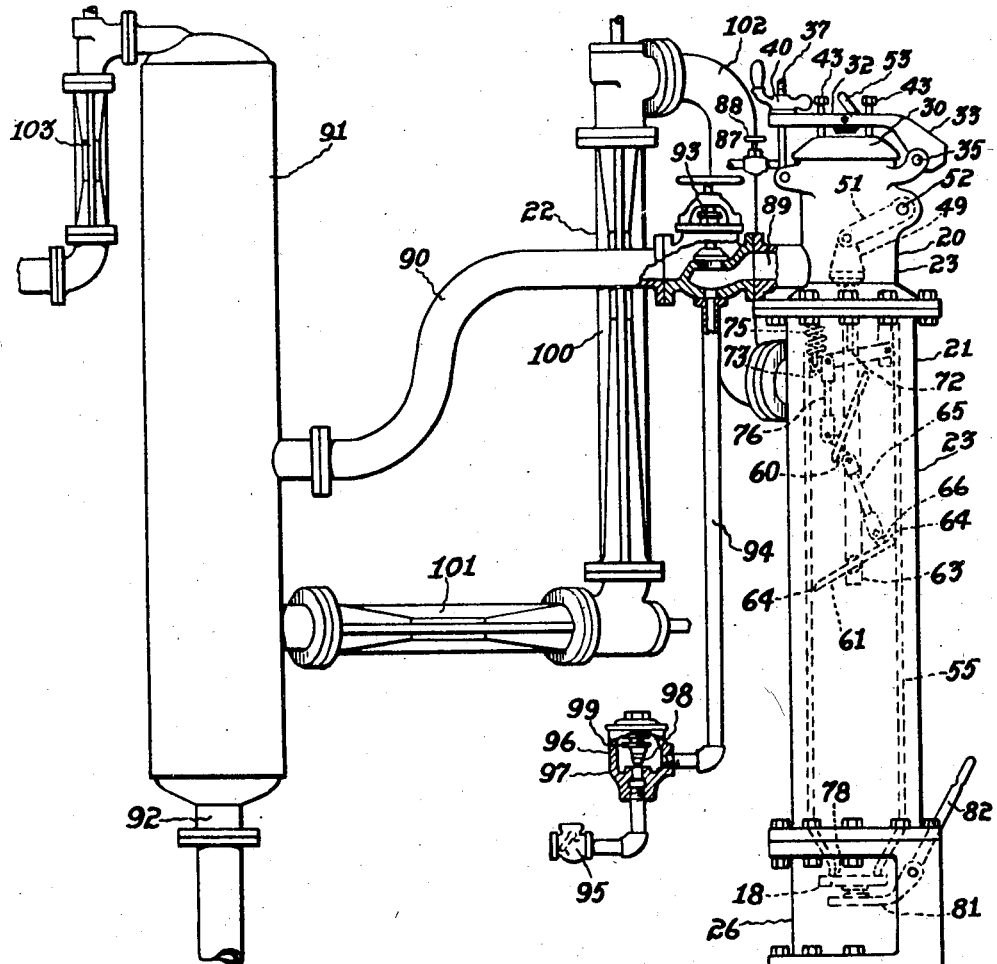
Figure 6:
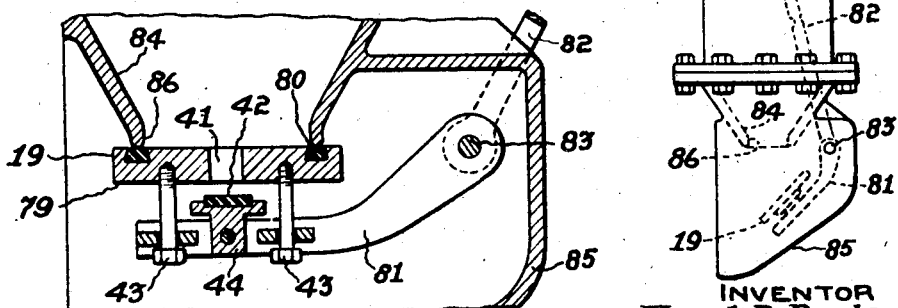

In the drawings accompanying this specification and in which similar reference numerals refer to similar parts, Figure 1 is an elevation, shown diagrammatically, of apparatus constructed in accordance with the practice of the invention, Figure 2 is an elevation, partly broken away, of the upper part of the main processing unit, Figure 3 is a similar view showing the remaining lower portion of the main processing unit, Figure 4 is a transverse view taken through Figure 2 on the line 4—4 looking in the direction indicated by the arrows, Figure 5 is a similar view also taken through Figure 2 on the line 5—5, and Figure 6 is an elevation, partly broken away and somewhat enlarged, of a detail.

Referring more particularly to the drawings, the apparatus, designated in its entirety by 20, comprises a main processing unit 21 and evacuating means, designated broadly 22, for creating a vacuum in certain zones of the main unit 21 to freeze the material intended to be processed.

In a preferred form the main unit 21 comprises an elongated casing 23 that may be constructed, as shown, in sections of suitable length and occupies a vertical position so that the food material may pass therethrough by gravity.

The interior of the casing 23 is divided into blanching, freezing and storing chambers 24, 25 and 26, respectively, the blanching chamber 24 being at the upper end of the casing and separated from the freezing chamber 25 by a wall 27. At the upper end of the blanching chamber is a charging opening 28 to admit the food material into the blanching chamber, and the end portion of the casing defining the opening constitutes a seat 29 for a cover 30 forming a closure for the opening 28. A sealing member 31 in the cover 30 engages the seating surface 29 to seal the casing at this point.

The cover 30 is manipulated through the medium of a lever 32 having an end 33 pivotally connected to a lug 34, on the casing, by a pin 35 extending through the two. The lever 32 overlies the cover 30 in spaced relation thereto, and in its opposite end is a slot 36 to receive an eye-bolt 37, the eye 38 of which is pivotally connected to a lug 39 on the casing 23. The force required for holding the cover in the closed position may be applied by a nut 40 on the eye-bolt and seating against the lever 32.

As will be explained more fully hereinafter, the vegetable material is subjected successively to a blanching medium and to a vacuum in the chamber 24. It is, therefore, desirable that provision be made to enable the vacuum in the chamber 24 to be conveniently broken preparatory to lifting of the cover 30. To this end an atmospheric port 41 is formed in the cover and the lever 32 carries a sealing member 42 to overlie the outer end of the port 41. In order, therefore, that the sealing member 42 may be removed from its sealing position before force is applied to the cover for lifting it, the latter is connected to the lever in such wise as to permit of relative movement between the two. This may, as shown, be accomplished by means of bolts 43 that extend loosely through the lever and are threaded into the outer surface of the cover. The bolts are of such length that when the cover is in the closed position the heads of the bolts are out of engagement with the lever which may, therefore, be moved independently of the cover 30 for first lifting the sealing member, and the lever next engages the bolt heads for removing the cover from the casing.

In the arrangement shown, the pressure of the lever 32 is transmitted to the cover 30 by the sealing member 42, and the sealing member is imbedded in a container 44 that is pivotally connected to the lever 32 to enable the sealing member to readily assume a correct position with respect to the port 41.

After being processed in the blanching chamber 24 the material is dumped into the freezing chamber through a transfer opening 45 in the wall 27. The opening 45 is beveled to guide the material toward the central portion of the freezing chamber 25 and forms a continuation of the inner surface of a hopper 46 having its lower end 47 seated in the wall 27. The hopper may be constructed of meshy material or be provided with suitable perforations 48 to permit the free flow of fluid medium to and from the material held by the hopper.

The opening 45 is controlled by a valve 49 the lower portion of which is beveled to conform with the opening 45 and carries a sealing member 50 to engage the surface of the opening 45 for effecting a seal between the chambers 24 and 25. The valve 49 is of frusto-conical shape and is pivotally connected to an end of an arm 51 the opposite end of which may be fixedly connected, in any well known manner, to a horizontal shaft 52 journaled in the casing 23. One end of the shaft 52 projects from the side of the casing to the exterior thereof and carries a lever 53 whereby the valve may be manually lifted and lowered with respect to the opening 45. Suitable sealing material 54 is inserted in the casing 23 around the shaft 52 to prevent leakage between it and the casing.

The freezing chamber 25 may, as shown, be of somewhat larger diameter than the chamber 24 and contains a cylindrical basket 55 of meshy material and of smaller diameter than the chamber to provide an annular space 56 between the basket and the casing. The basket rests with its lower end upon a wall 57 separating the freezing chamber 25 from the storage chamber 26 and its upper end lies directly beneath the transfer opening 45 to receive the vegetable material and extends into a ring 58 lying in an annular recess 59 in the casing 23 to assist in holding the basket coaxial with the casing.

Means are provided for preventing partly processed material from being deposited upon frozen material in the lower portion of the freezing chamber. To this end plates or baffles, two in the example shown and designated 60 and 61, are arranged within the basket 55. The baffles are tiltable and carry trunnions 62 that are journaled in support bars 63 on the exterior of the basket. The support bars may be secured to the basket in any suitable manner, as by spot welding, and may be additionally supported by the ring 58.

The baffles are preferably of elliptical shape to provide points or portions 64 of maximum distance from the axes of rotation of the baffles to engage the basket at points above and below the transverse planes of the trunnions and thereby cause the baffles to always assume inclined positions for intercepting the material. This is desirable for the reason that the major portion of the loads of material will then rest upon the low sides of the baffles and only a light force will be required for tilting them.

In the arrangement shown, the baffles 60 and 61 tilt in unison, although in opposite directions, and responsively to the movements of the valve 49. They are accordingly connected by a rod 65 that is adjustable for length and is pivotally connected at one end to a lug 66 on the high wing of the baffle 61 and at its opposite end to a lug 67 on the low wing of the baffle 60. The rod 65 thus extends diagonally of the chamber 25 and causes the corresponding ends of the baffles to move simultaneously in opposite directions whenever tilting force is applied to one of the baffles.

In the present instance this force is applied, in part, manually through the lever 53 and associated elements including the valve 49 and a rod 68 on the valve that extends downwardly into the basket 55. The rod is guided at a suitable distance below the valve by a rib 69 extending across the bore of an annular plate 70 seated upon the ring 58 and secured thereto by bolts 71. The lower or free end of the rod is in the form of a point 72 that rests upon the intermediate portion of a bar 73 having an end pivotally connected to a lug 74 on and depending from the annular plate 70 into the basket above the high wings of the baffles.

A tension spring 75, also in the basket 55, is connected to the opposite end of the bar 73 and to the annular plate 70 and presses the bar 73 against the pointed end 72 of the rod 68 to cause the bar 73 to follow the movement of the rod. These movements of the bar 73 are transmitted to the baffle 60 by a rod 76 similar to the rod 65 and pivotally connected at its upper end to the bar 73 between the rod 68 and the spring 75. The opposite end of the rod 76 is pivotally connected to the low wing of the baffle 60.

The portion of the freezing chamber below the baffle 61 may be of a capacity capable of accommodating a desired number of batches of frozen vegetable material, and at its lowermost end is a hopper 77 shown as an integral part of the wall 57 and extending into the storage chamber 26 to guide the frozen product thereinto. The discharge opening 78 of the hopper is normally sealed by a device 18 similar in all essential respects to that used for sealing the charging end of the blanching chamber 24 and accordingly including a cover 79 containing a sealing member 80 to engage the end of the hopper 77.

In this arrangement the cover 79 lies above the operating lever 81 to which it is interlockingly connected by the bolts 43, and the bolts, as will be understood, have the required degree of sliding movement in the lever 81 to permit the lever to move relatively to the cover 79 for first unseating the sealing member 42 to break the vacuum in the freezing chamber. The lever 81 is moved by manual force applied to an arm 82 located exteriorly of the casing 23 and affixed, in a suitable manner, to a rocker shaft 83 for the lever 81.

The storage chamber 26 is preferably of the same capacity as the lower or storage portion of the freezing chamber and has a hopper 84 at its lower end through which the material passes into a guide member 85 partly encircling the hopper 84 to guide the frozen material into a suitable receptacle for transportation or final storage. The discharge end 86 of the hopper is normally sealed by a sealing device 19 constructed in all respects and operated in the same manner as the sealing device 18.

As has been hereinbefore stated, the material introduced into the blanching chamber for the first step of processing is subjected successively to a blanching medium such as steam and to a vacuum. The steam is introduced into the chamber 24 by a pipe 87 and controlled by a valve 88 in said pipe. At the lower end of the blanching chamber, in the transverse plane of the hopper 46, is an outlet opening 89 that opens into a conduit 90 leading to a condenser 91 of the barometric type forming a part of the evacuating means 22. The condenser has a conduit 92 at its lower end to serve as a condensate outlet.

Communication between the blanching chamber 24 and the condenser is controlled by a manually operable valve 93 in the conduit 90, and an outlet is provided for the escape of air from the blanching chamber to the atmosphere by a conduit 94 communicating with the conduit 90 at a point between the valve 93 and the blanching chamber 24. The outlet end of the conduit 94 is controlled by a check valve 95 that serves to prevent the flow of air from the atmosphere through the conduit to the blanching chamber, and in an intermediate portion of the conduit 94, between the check valve 95 and the conduit 90 is a thermostatic trap 96, of a well known type, including a casing 97 to which the adjacent ends of the conduit 94 are connected. The valve element 98 is actuated by a thermostat 99 for controlling communication between the several sections of the conduit 94 attached to the casing 97.

The means employed for creating the desired vacuum in the freezing chamber 25 comprises a pair of steam jet ejectors 100 and 101 arranged in tandem between the freezing chamber and the condenser 91. The ejector 101 may, as shown, be arranged to discharge directly into the condenser 91 at a point below the conduit 90 and the ejector 100 communicates with the freezing chamber 25 at a point near the upper end thereof through a conduit 102. Another stage of pumping in the evacuating means 22 is effected by a steam jet ejector 103 connected to the upper end of the condenser 91.

The operation of the device is as follows: Let it be assumed that all the jet ejectors are in operation for evacuating the freezing chamber 25 and the condenser 91 and that it be intended to charge the blanching chamber 24 with material for the initial step of processing it. Under these conditions the valve 49 rests upon the beveled surface of the transfer opening 46 to seal the upper end of the freezing chamber, and the outlet ends of the hoppers 77 and 84 are sealed by the devices 18 and 19. The valve 93 then also occupies its closed position to prevent communication between the blanching chamber and the evacuating means.

After the vegetable material has been placed in the blanching chamber 24 the cover 30 is placed upon the seating surface 29 and the sealing member over the port 41 and both are clamped in sealing position by means of the nut 40. Steam is then introduced into the blanching chamber through the pipe 87 for blanching the material. The steam thus admitted into the chamber 24 drives the air therefrom through the outlet opening 89, the conduit 94 to the atmosphere, and when the steam reaches the thermostat 99 the latter will move the valve 98 into position to cut-off communication between the blanching chamber and the atmosphere. The chamber 24 will then be completely sealed and steam of the required pressure, as for example eight pounds gauge, will be permitted to flow into the blanching chamber for a suitable period of time, say two or three minutes, to effect inactivation of the enzymes contained in the food product.

At the expiration of the blanching period the time of which, as will be readily understood, may vary with the pressure of the steam and the product being treated, the flow of steam into the blanching chamber 24 is cut-off. Immediately thereafter the valve 93 is opened to place the blanching chamber 24 in communication with the condenser 91 and thereby subject the material to the condenser pressure which is preferably maintained at about one and one-half inches of mercury, absolute.

After the blanching chamber 24 has been evacuated the valve 49 is lifted to permit the material to flow into the basket 55. During the upward movement of the valve the spring 75 will contract and lift the free end of the bar 73 thereby causing the baffle 60 to tilt into and the baffle 61 to tilt out of engagement with the basket.

The material will then lodge upon the baffle 60, and upon the subsequent lowering of the valve 49 to its sealing position its movement is transmitted through the rod 68 and associated linkage to the baffles for rocking them simultaneously to their other limiting positions. During this movement of the baffles the material is dumped from the baffle 60 upon the baffle 61 where it will remain as long as the valve 49 occupies its sealing position and will be subjected to the higher vacuum in the freezing chamber to an absolute pressure required to effect complete freezing thereof.

Meanwhile, the chamber 24 is again charged with material, it being understood, of course, that during this time the valve 93 is first closed to cut-off communication between the blanching chamber and the evacuating means 22. After the new batch of material has been blanched and the chamber 24 again evacuated the valve 49 is raised to dump the material into the freezing chamber. The spring 75 will then tilt the baffles 60 and 61 to bring the baffle 60 into position for intercepting the material dropping from the chamber 24 and to dump the previous batch from the baffle 61 into the lower portion of the freezing chamber. This sequence of events may be repeated until the storage space below the baffle 61 has been filled.

Whenever it is intended to remove the frozen product from the freezing chamber and assuming, of course, that the sealing device 19 occupies its sealing position on the end of the hopper 84, the sealing device 18 is removed from the end of the hopper 77. The frozen product will then fall into the storage chamber 26, whence it may be removed for final storage.

After the product has been thus transferred to the storage chamber 26 the sealing device 18 is again placed in its sealing position and the processing steps heretofore described may be repeated in the chambers 24 and 25 for treating other batches of material.

From the foregoing description it will be readily appreciated that the vacuum in the freezing chamber need be broken only at widely spaced intervals of time. For example, in a unit having a storage space in the freezing chamber capable of accommodating six batches of material and assuming that the time required for blanching, freezing and transferring the material thereto is approximately five minutes per batch, the vacuum in the freezing chamber need be broken only at intervals of thirty minutes, or thereabouts. This is a highly desirable feature since it obviates the frequent exposure of the product to air which, as is well known, has a deleterious effect upon the vitamin content of many food materials.

A further highly desirable feature of the present invention is that it makes possible the handling of the material in such a way that after the air has been expelled from the blanching chamber the material need not again be exposed to air until it is completely frozen.

Moreover, owing to the arrangement of the baffles 60 and 61 and the manner in which they operate it will be impossible for only partly processed material to reach the storage space in the freezing chamber and be transferred into the storage chamber 26 in that condition.

I claim:
1. The method of processing food in two zones which comprises subjecting the food to a blanching medium in one zone, utilizing such blanching medium for expelling air from said one zone, next subjecting the food in said one zone to a vacuum, maintaining a vacuum in the other zone, interconnecting the zones, transferring the food to said other zone, cutting-off communication between the zones, and continuing subjecting the food to a vacuum for freezing the food.

2. The method of processing food in two zones which comprises subjecting the food to a blanching medium in one zone, utilizing such blanching medium for expelling air from said one zone, next subjecting the food in said one zone to a vacuum, maintaining such vacuum, maintaining a vacuum in the other zone, establish direct communication between the zones and simultaneously transfer the food to the said other zone, cutting-off communication between the zones, and continuing subjecting the food to a vacuum for freezing the food.

3. The method of processing food in two zones which comprises subjecting the food to a blanching medium in one zone, utilizing such blanching medium for expelling air from said one zone, creating a vacuum in both zones, transferring the food to the other zone and subjecting the food to a vacuum during such transference, cutting-off communication between the zones, and continuing subjecting the food to a vacuum for freezing the food.

FRANK B. DOYLE.

REFERENCES CITED

The following references are of record in the file of this patent:

UNITED STATES PATENTS

| Number | Name | Date |
|---|---|---|
| 1,884,429 | Warner | Oct. 25, 1932 |
| 1,910,009 | Grayson | May 23, 1933 |
| 1,938,522 | Grayson | Dec. 5, 1933 |
| 2,364,049 | Bensel | Dec. 5, 1944 |